(12) United States Patent
Mora López et al.

(10) Patent No.: US 10,445,427 B2
(45) Date of Patent: Oct. 15, 2019

(54) SEMANTIC PARSING WITH KNOWLEDGE-BASED EDITOR FOR EXECUTION OF OPERATIONS

(71) Applicant: Fujitsu Limited, Kawasaki-shi, Kanagawa (JP)

(72) Inventors: José Mora López, Madrid (ES); Boris Villazón-Terrazas, Madrid (ES); Victor De La Torre, Madrid (ES); Alejandro Llaves, Madrid (ES); Manuel Peña Muñoz, Seville (ES)

(73) Assignee: FUJITSU LIMITED, Kawasaki (JP)

( * ) Notice: Subject to any disclaimer, the term of this patent is extended or adjusted under 35 U.S.C. 154(b) by 87 days.

(21) Appl. No.: 15/730,001

(22) Filed: Oct. 11, 2017

(65) Prior Publication Data

US 2018/0113857 A1    Apr. 26, 2018

(30) Foreign Application Priority Data

Oct. 21, 2016 (DE) .................. 10 2016 220 777

(51) Int. Cl.
*G06N 5/00* (2006.01)
*G06F 17/27* (2006.01)
(Continued)

(52) U.S. Cl.
CPC ........ *G06F 17/2785* (2013.01); *G06F 3/0482* (2013.01); *G06F 9/4881* (2013.01);
(Continued)

(58) Field of Classification Search
CPC .... G06F 16/245; G06F 19/00; G06F 17/2785; G06F 16/219; G06F 16/2291; G06F 17/27
See application file for complete search history.

(56) References Cited

U.S. PATENT DOCUMENTS 4,068,300 A     1/1978  Bachman
6,961,736 B1   11/2005  Amirghodsi
(Continued)

FOREIGN PATENT DOCUMENTS

CA    2883922       8/2011
CN    101262374    9/2008
(Continued)

OTHER PUBLICATIONS

US 9,299,346 B1, 03/2016, Hart et al. (withdrawn)
(Continued)

*Primary Examiner* — Tammara R Peyton
(74) *Attorney, Agent, or Firm* — Staas & Halsey LLP

(57) ABSTRACT

A data processing apparatus including a library, storing software services, each executing a data processing function; a user interface receiving commands, expressed in a language and defining a data processing target and a data processing request; and a parser. The parser extracting from each command: the request from the language; and the target. A knowledge base maintaining a record of the request and the target; a scheduler obtaining the request from the parser, and compiling a schedule to fulfill the request; a controller controlling execution of the schedule, the target being the input data to the execution, and to output a result; and a result processor obtaining the result, and, based on records of requests and targets, to identify a request candidate, and to output to the user as a selectable command in the language, via the user interface, the candidate with the result defined as a data processing target.

13 Claims, 4 Drawing Sheets

(51) Int. Cl.
*G06F 16/245* (2019.01)
*G06F 3/0482* (2013.01)
*G06F 9/48* (2006.01)
*G06F 9/50* (2006.01)
G06F 16/22 (2019.01)
G06F 16/21 (2019.01)
G06F 17/00 (2019.01)
G06N 5/04 (2006.01)

(52) U.S. Cl.
CPC .......... *G06F 9/5055* (2013.01); *G06F 16/245* (2019.01); *G06F 16/219* (2019.01); *G06F 16/2291* (2019.01); *G06F 17/00* (2013.01); *G06F 17/27* (2013.01); *G06N 5/04* (2013.01)

(56) References Cited

U.S. PATENT DOCUMENTS

| | | | |
|---|---|---|---|
| 7,433,835 | B2 | 10/2008 | Frederick et al. |
| 7,584,152 | B2 | 9/2009 | Gupta et al. |
| 7,617,174 | B2 | 11/2009 | Chen et al. |
| 7,734,515 | B1 | 6/2010 | Frederick et al. |
| 7,912,763 | B1 | 3/2011 | Frederick et al. |
| 8,019,652 | B1 | 9/2011 | Frederick et al. |
| 8,019,653 | B1 | 9/2011 | Frederick et al. |
| 8,036,261 | B2 | 10/2011 | Tsutsui et al. |
| 8,312,426 | B2 | 11/2012 | Bouillet et al. |
| 8,391,590 | B2 | 5/2013 | Yalla et al. |
| 8,660,849 | B2 * | 2/2014 | Gruber .................... G10L 15/22 704/275 |
| 8,788,269 | B2 | 7/2014 | Stifelman et al. |
| 9,026,431 | B1 * | 5/2015 | Moreno Mengibar ..................... G10L 15/1822 704/10 |
| 9,064,006 | B2 | 6/2015 | Hakkani-Tur et al. |
| 9,299,331 | B1 | 3/2016 | Durham et al. |
| 2002/0083060 | A1 | 6/2002 | Wang et al. |
| 2004/0107821 | A1 | 6/2004 | Alcalde et al. |
| 2005/0060350 | A1 | 3/2005 | Baum et al. |
| 2005/0165656 | A1 | 7/2005 | Frederick et al. |
| 2005/0177372 | A1 | 8/2005 | Wang et al. |
| 2006/0013451 | A1 | 1/2006 | Haitsma |
| 2006/0136428 | A1 | 6/2006 | Syeda-Mahmood |
| 2006/0206883 | A1 | 9/2006 | Sabbouh |
| 2008/0208855 | A1 | 8/2008 | Lingenfelder et al. |
| 2009/0007195 | A1 * | 1/2009 | Beyabani ................ H04N 7/163 725/86 |
| 2009/0070103 | A1 * | 3/2009 | Beggelman ............. G06F 17/27 704/9 |
| 2009/0277322 | A1 | 11/2009 | Cai et al. |
| 2011/0093479 | A1 * | 4/2011 | Fuchs ................... G06F 17/271 707/755 |
| 2011/0314375 | A1 | 12/2011 | Zaika et al. |
| 2012/0016678 | A1 | 1/2012 | Gruber et al. |
| 2013/0019285 | A1 | 1/2013 | Barborak et al. |
| 2013/0054244 | A1 | 2/2013 | Bao et al. |
| 2013/0097320 | A1 | 4/2013 | Ritter et al. |
| 2013/0117207 | A1 | 5/2013 | Kim et al. |
| 2013/0144876 | A1 | 6/2013 | Mehanna et al. |
| 2013/0151451 | A1 | 6/2013 | Lee et al. |
| 2013/0275164 | A1 | 10/2013 | Gruber et al. |
| 2013/0311997 | A1 | 11/2013 | Gruber et al. |
| 2014/0149104 | A1 | 5/2014 | Kim et al. |
| 2014/0201629 | A1 | 7/2014 | Heck |
| 2014/0280616 | A1 | 9/2014 | Ramanathan et al. |
| 2014/0310127 | A1 | 10/2014 | Hoch et al. |
| 2014/0337358 | A1 | 11/2014 | Mitra |
| 2014/0337814 | A1 | 11/2014 | Kalns et al. |
| 2014/0344439 | A1 | 11/2014 | Kempf et al. |
| 2014/0365885 | A1 | 12/2014 | Carson et al. |
| 2015/0245216 | A1 | 8/2015 | Cohen et al. |
| 2015/0271276 | A1 | 9/2015 | Edlund et al. |
| 2015/0348554 | A1 | 12/2015 | Orr et al. |
| 2015/0382079 | A1 | 12/2015 | Lister et al. |
| 2016/0026680 | A1 | 1/2016 | Banerjee et al. |
| 2016/0026913 | A1 | 1/2016 | Moon et al. |
| 2016/0042058 | A1 * | 2/2016 | Nguyen ............. G06F 16/3344 707/771 |
| 2016/0044380 | A1 | 2/2016 | Barrett |
| 2016/0048771 | A1 | 2/2016 | Chen et al. |
| 2016/0062604 | A1 | 3/2016 | Kraljic et al. |
| 2016/0063874 | A1 | 3/2016 | Czerwinski et al. |
| 2016/0063989 | A1 | 3/2016 | Deleeuw |
| 2016/0063998 | A1 | 3/2016 | Krishnamoorthy et al. |
| 2016/0066035 | A1 * | 3/2016 | Chesluk ............. H04N 21/4532 725/109 |
| 2016/0070580 | A1 | 3/2016 | Johnson et al. |
| 2016/0140172 | A1 | 5/2016 | Bornea et al. |
| 2017/0006116 | A1 | 1/2017 | Kelly et al. |
| 2017/0242886 | A1 * | 8/2017 | Jolley ................. G06F 17/2705 |
| 2018/0121418 | A1 * | 5/2018 | Chatterjee ............. G06F 17/218 |
| 2019/0005012 | A1 * | 1/2019 | Priestas ................. G06N 20/00 |
| 2019/0018839 | A1 * | 1/2019 | Ge ....................... G06F 17/2785 |

FOREIGN PATENT DOCUMENTS

| | | |
|---|---|---|
| CN | 103038738 | 4/2013 |
| CN | 104202416 | 12/2014 |
| CN | 105164719 | 12/2015 |
| CN | 105357143 | 2/2016 |
| DE | 102012019178 | 4/2013 |
| EP | 2325837 | 5/2011 |
| EP | 2618280 | 7/2013 |
| EP | 2704029 | 3/2014 |
| EP | 2894587 | 7/2015 |
| EP | 3041198 | 7/2016 |
| EP | 3 096 226 | 11/2016 |
| GB | 2495222 | 4/2013 |
| KR | 10-2012-0052610 | 5/2012 |
| KR | 10-2013-0050707 | 5/2013 |
| KR | 10-2013-0064960 | 6/2013 |
| KR | 10-2014-0066640 | 6/2014 |
| TW | 201543243 | 11/2015 |
| TW | 201544974 | 12/2015 |
| TW | 201545504 | 12/2015 |
| WO | 2004/107217 | 12/2004 |
| WO | 2008/015417 | 2/2008 |
| WO | 2011/088053 | 7/2011 |
| WO | 2015/191965 | 12/2015 |
| WO | 2016/066035 | 5/2016 |
| WO | 2016/105624 | 6/2016 |

OTHER PUBLICATIONS

Alfio Ferrara et al., Automatic Identity Recognition in the Semantic Web, Universita degli Studi di Milano, 15 pages.
P. Cornillon et al., "Opendap: Accessing Data in a Distributed, Heterogeneous Environment", Data Science Journal, vol. 2, Nov. 2003, 11 pages.
Sebastian Bremm et al., "Assisted Descriptor Selection Based on Visual Comparative Data Analysis", Eurographics / IEEE Symposium on Visualization 2011, 10 pages.
Avery Li-Chun Wang et al., "An Industrial-Strength Audio Search Algorithm", 7 pages.
Sabri Boutemedjet, et al., "Unsupervised Feature Selection for Accurate Recommendation of High-Dimensional Image Data", 8 pages.
European Search Report dated May 10, 2017 in European Patent Application No. 16205543.8.
Christian Drumm et al: "Quickmig", Proceedings of the ACM Sixteenth Conference on Information and Knowledge Management (CIKH 2007), Nov. 6-9, 2007, Lisboa, Portugal, ACM, 2 Penn Plaza, Suite 701 New York NY 10121-0701 USA, Nov. 6, 2007 (Nov. 6, 2007), pp. 107-116, XP058192912, DOI: 10.1145/1321440. 1321458 ISBN: 978-1-59593-803-9.
Anhai Doan et al: "Reconciling Schemas of Disparate Data Sources: A Machine-Learning Approach", ACM SIGMOD 2001, Santa Barbara, CA, USA, May 24, 2001 (May 24, 2001), XP055046420, Retrieved from the Internet: URL:http://reference.kfupm.edu.sa/content/r/e/reconciling_schemas_of_disparate_data_so_34545.pdf [retrieved on 2812-12-83].

(56) References Cited

OTHER PUBLICATIONS

"Corel Image Features Data Set", UCI Machine Learning Repository, retrieved from the internet Jun. 2017, https://archive.ics.uci.edu/ml/datasets/Corel+Image+Features, 3 pages.
TechTC—Technion Repository of Text Categorization Datasets, Maintained by Evgeniy Gabrilovich, retrieved from the internet Jun. 2017, http://techtc.cs.technion.ac.il/, 7 pages.
E. Prud'hommeaux and A. Seaborne, "SPARQL Query Language for RDF," W3C, W3C Recommendation, Jan. 2008, 74 pages.
F. Holzschuher and R. Peini, "Performance of Graph Query Languages" Cornparison of Cypher, Gremlin and Native Access in Neo4j, 2013, 10 pages.
J. Mora and O. Corcho, "Engineering Optimisations in Query Rewriting for OBDA," in Proceedings of the $9^{th}$ International Conference on Semantic Systems, 2013, pp. 41-48.
J. Mora, R. Rosati, and O. Corcho, "Kyrie2: Query Rewriting under Extensional Constraints in \mathcal{ELHIO}," in the Semantic Web ISWC 2014, P. Mika, T. Tudorache, A. Bernstein, C. Welty, C. Knoblock, D. Vrandečić, P. Groth, N. Noy, K. Janowicz, and C. Goble, Eds. Springer international Publishing, 2014, pp. 568-583.
L. Richardson and S. Ruby, RESTful web services—web services for the real world. O'Reilly, 2007, 448 pages.
S. Vinoski, "RESTful Web Services Development Checklist," IEEE Internet Computing, vol. 12, No. 6, pp. 94-96, Nov. 2008, 3 pages.
R. T. Fielding, Architectural Styles and the Design of Network-based Software Architectures. 2000, 180 pages.
M. zur Muehlen, J. V. Nickerson, and K. D. Swenson, "Developing web services choreography standards—the case of REST vs. SOAP." Decision Support Systems, vol. 40, No. 1, pp. 9-29, 2005.
M. Arenas, A. Bertails, E. Prud'hommeaux, and J. Sequeda, "A Direct Mapping of Relational Data to RDF," 2012, 11 pages.
S. Thakkar, J. L. Ambite, and C. A. Knoblock, "Composing, optimizing, and executing plans for bioinformatics web services," The VLDB Journal, vol. 14, No. 3, pp. 330-353, Sep. 2005.
European Search Report dated Jul. 4, 2017 in European Patent Application No. 16204653.6.
Ison, Jon, Kristoffer Rapacki, Hervé Ménager, Matúš, Kalaš, Emil Rydza, Piotr Chmura, Christian Anthon, et al. 2016. "Tools and Data Services Registry: A Community Effort to Document Bioinforrnatics Resources." Nucleic Acids Research 44 (D1): D38-D47. doi:10.1093/nar/gkv1116.
Maleshkova, Maria, Carlos Pedrinaci, and John Domingue. 2009. "Supporting the Creation of Semantic RESTful Service Descriptions." in. Washington D.C., USA. http://oro.open.ac.uk/23106/, 15 pages.
Rama Akkiraju et al. "Web Service Semantics—WSDL-S". In: Kno.e.sis Publications (Apr. 2005). url: http://corescholar.libraries.wright.edu/knoesis/69, 44 pages.
David Chappell, Enterprise Service Bus. en, "O'Reilly Media, Inc.", Jun. 2004. isbn: 978-0-596-00675-4.
R. Chinnici et al. Web Services Description Language (WSDL) version 1.2. Tech. rep. Working Draft. 2002. url: http://www.w3.org/TR/wsdl (visited on Mar. 14, 2016), 27 pages.
F. Curbera et al. "Unraveling the Web services web: an introduction to SOAP, WSDL, and UDDI". In: IEEE Internet Computing 6.2 (Mar. 2002), pp. 86-93, issn: 1089-7801, doi: 10.1109/4236.991449, 8 pages.
Keir Davis, John W. Turner, and Nathan Yocom. "Client-Server Architecture". en. In: The Definitive Guide to Linux Network Programming. DOI: 10.1007/978-1-4302-0748-1 5. Apress, 2004, pp. 99-135. isbn: 978-1-59059-322-6 978-1-4302-0748-1. url: http://link.springer.com/chapter/10.1007/978-1-4302-0748-1_5 (visited on Mar. 14, 2016).
Daniel Fitzner, Jorg Hoffmann, and Eva Klien. "Functional description of geoprocessing services as conjunctive datalog queries". en. In: GeoInformatica 15.1 (Oct. 2009), pp. 191-221. issn: 1384-6175, 1573-7624. doi: 10.1007/s10707-009-0093-4. url: http://link.springer.com/article/10.1007/s10707-009-0093-4 ((visited on Mar. 29, 2016).
Martin Hofmann. "Syntax and semantics of dependent types". en. In: Extensional Constructs in Intensional Type Theory. CPHC/BCSDistinguished Dissertations. DOI: 10.1007/978-1-4471-0963-1 2. Springer London, 1997, pp. 13-54. isbn: 978-1-4471-1243-3 978-1-4471-0963-1. url: http://link.springer.com/chapter/10.1007/978-14471-0963-1_2 (visited on Mar. 14, 2016).
Kopecky, K. Gomadam, and T. Vitvar. "hRESTS: An HTML Microformat for Describing RESTful Web Services". In:IEEE/WIC/ACM International Conference on Web Intelligence and Intelligent Agent Technology, 2008. WI-IAT '08. vol. 1. Dec. 2008, pp. 619-625. dol: 10.1109/WIIAT.2008.379.
Jacek Kopecky, Web Services Description Language (WSDL) Version 2.0: RDF Mapping. Published: World Wide Web Consortium, Note NOTE-wsdl20-rdf-20070626. Jun. 2007, 39 pages.
Kathryn B. Laskey and Kenneth Laskey. "Service oriented architecture". en. In: Wiley Interdisciplinary Reviews: Computational Statistics 1.1 (Jul. 2009), pp. 101-105. issn: 1939-0068. doi: 10.1002/wics.8. url: http://onlinelibrary.wiley.com/doi/10.1002/wics.8/abstract (visited on Mar. 14, 2016).
David Martin et al. "OWL-S: Semantic markup for web services". In: W3C member submission 22 (2004), 28 pages.
Sam Newman. Building Microservices. en. "O'Reilly Media, Inc.", Feb. 2015. isbn: 978-1-4919-5033-3, 473 pages.
Carlos Pedrinaci et al. "Adaptive Service Binding with Lightweight Semantic Web Services". en. In: Service Engineering. DOI: 10,1007/978-3-7091-0415-6 9, Springer Vienna; 2011, pp. 233-260. isbn: 9783-7091-0414-9 978-3-7091-0415-6. url: http://link.springer.com/chapter/10.1007/978-3-7091-0415-6_9 (visited on Mar. 30, 2016).
R. Perrey and M. Lycett. "Service-oriented architecture". In: 2003 Symposium on Applications and the Internet Workshops, 2003. Proceedings. Jan. 2003, pp. 116-119. doi: 10.1109/SAINTW.2003.1210138.
Amit Sheth, Karthik Gomadam, and Ajith Ranabahu. "Semantics Enhanced Services: METEOR-S, SAWSDL and SA-REST" .In: Bulletin of the Technical Committee on Data Engineering (Sep. 2008), pp. 8-12. url: http://corescholar.libraries.wright.edu/knoesis/635.
J. Thones. "Microservices". In: IEEE Software 32.1 (Jan. 2015), pp. 116-116. issn: 0740-7459. doi:10.1109/MS.2015.11.
Tomas Vitvar et al. "WSMO-Lite Annotations for Web Services". en. In: The Semantic Web: Research and Applications. Ed. by Sean Bechhofer et al. Lecture Notes in Computer Science 5021. DOI: 10.1007/978-3-540-68234-9 49. Springer Berlin Heidelberg, Jun. 2008, pp. 674-689. isbn: 978-3-540-68233-2 978-3-540-68234-9. url: http: //link.springer.com/chapter/10.1007/978-3-540-682349_49 (visited on Mar. 30, 2016).
H. Q. Yu et al. "Developing RDF-based Web Services for supporting runtime matchmaking and invocation". In: 2011 7th International Conference on Next Generation Web Services Practices (NWeSP). Oct. 2011, pp. 392-397. doi: 10.1109/NWeSP.2011.6088211.
Martin Abadi et al. "TensorFlow: Large-Scale Machine Learning on Heterogeneous Distributed Systems". In: arXiv:1603.04467 [cs] (Mar. 2016). arXiv: 1603.04467. url: http://arxiv.org/abs/ 1603.04467 (visited on Apr. 5, 2016).
Soheil Bahrampour et al. "Comparative Study of Caffe, Neon, Theano, and Torch for Deep Learning," In: CoRR abs/1511.06435 (2015). url: http://dblp.uni-trier.de/db/journals/corr/corr1511.html#BahrampourRSS15 (visited on Apr. 5, 2016).
Lynsey Barber. This is why the world needs a Facebook virtual assistant. Aug. 2015. url: http://www.cityam.com/223196/ why-world-needs-facebook-m-its-new-ai-and-peoplepowered-virtual-personal-assistantmessenger (visited on Apr. 5, 2016).
James Bergstra et al. "Theano: Deep learning on gpus with python". In: NIPS 2011, BigLearning Workshop, Granada, Spain. 2011. url: http://biglearn.org/2011/fiies/papers/biglearn2011_submission_18.pdf (visited on Apr. 5, 2016).
Jeff Bezanson et al."Julia: A Fast Dynamic Language for Technical Computing". In: arXiv:1209.5145 [cs] (Sep. 2012). arXiv: 1209.5145. url: http://arxiv.org/abs/1209.5145 (visited on Apr. 1, 2016).
Brian X. Chen. "Siri, Alexa and Other Virtual Assistants Put to the Test". In: The New York Times (Jan. 2016). issn: 0362-4331. url: http://www.nytimes.com/2016/01/28/technology/ personaltech/siri-alexa-and-other-virtualassistantsput-to-the-test.html (visited on Apr. 5, 2016).

(56) References Cited

OTHER PUBLICATIONS

Gianmarco De Francisci Morales and Albert Bifet. "Samoa: Scalable advanced massive online analysis". In: The Journal of Machine Learning Research 16.1 (2015), pp. 149-153. url: http://dl.acm.org/citation.cfm?id=2789277 (visited on Apr. 5, 2016).

Janez Demsar et al. "Orange: data mining toolbox in python." In: Journal of Machine Learning Research 14.1 (2013), pp. 2349-2353. url: http://dblp.uni-trier.de/db/Journals/jmlr/jmlr14.html#DemsarCEGHMMPTSSUZZZZ13 (visited on Apr. 5, 2016).

A. Ghoting et al. "SystemML: Declarative machine learning on MapReduce". In: 2011 IEEE 27th International Conference on Data Engineering (ICDE). Apr. 2011, pp. 231-242. doi: 10.1109/ICDE.2011.5767930.

Yangqing Jia et al. "Caffe: Convolutional Architecture for Fast Feature Embedding". In: Proceedings of the $22^{nd}$ ACM International Conference on Multimedia. MM '14. New York, NY, USA: ACM, 2014, pp. 675-678. isbn: 978-1-4503-3063-3. doi: 10.1145/2647868.2654889. url: http://doi.acm.org/10.1145/2647868.2654889 (visited on Apr. 5, 2016).

Eric Jones, Travis Oliphant, and Pearu Peterson. "SciPy: Open source scientific tools for Python". In: (2001). url: http://www.scipy.org (visited on Apr. 5, 2016).

Supun Kamburugamuve et al. Survey of distributed stream processing for large stream sources. Tech. rep. Technical report. 2013. Available at http://grids. ucs. indiana. edu/ptliupages/publications/survey stream proc essing. pdf, 2013. url: https://www.sics.se/~amir/files/ download/dic/2013%20-%20Survey%20of%20Distributed%20Stream%20Processing%20for%20Large%20Stream%20Sources.pdf (visited on Apr. 5, 2016).

Heather Kelly. Which is the best digital assistant: Siri, Cortana, Alexa or Google Now? Jul. 2015. url: http://money.cnn. com/2015/07/28/technology/digital-assistant-interview/index.html (visited on Apr. 5, 2016).

Marc Kohlbrugge, An email app Don Draper would use. Apr. 2014. url: https://medium.com/@marckohlbrugge/an-emailappdon-draper-would-use-1bccaf2b55b7 (visited on Apr. 5, 2016).

Ingrid Lunden. X.ai Lands $2.1M to Build 'Amy', An AI-Powered Personal Assistant for Meetings. 2014. url: http://social. techcrunch.com/2014/05/21/x-ai-lands-2m-to-build-amyan-ai-powered-personal-assistant-for-meetings/ (visited on Apr. 5, 2016).

Wes McKinney, "pandas: a Foundational Python Library for Data Analysis and Statistics". In: Python for High Performance and Scientific Computing (2011), pp. 1-9. url: http://www.dlr.de/sc/Portaldata/15/Resources/dokumente/pyhpc2011/submissions/pyhpc2011_submission_9.pdf (visited on Apr. 5, 2016).

Wes McKinney, Python for Data Analysis: Data Wrangling with Pandas, NumPy, and IPython. O'Reilly Media, Nov. 2012. isbn: 978-1-4493-1979-3. url: http://www.amazon.ca/exec/obidos/redirect?tag=citeulike09-20&path=ASIN/1449319793 (visited on Apr. 5, 2016).

Joanne Mcneil. "Why Do I Have to Call This App 'Julie'?" In: The New York Times (Dec. 2015). issn: 0362-4331. url: http://www.nytimes.com/2015/12/20/opinion/sunday/why-do-ihave-to-call-this-app-julie.html (visited on Apr. 5, 2016).

Dharmendra S. Modha et al. "Cognitive Computing". In: Commun. ACM 54.8 (Aug. 2011), pp. 62-71. issn: 0001-0782. doi: 10.1145/1978542.1978559. url: http://doi.acm.org/10.1145/1978542.1978559 (visited on Apr. 1, 2016).

Sean Owen et al. Mahout in Action. Greenwich, CT, USA: Manning Publications Co., 2011. isbn: 978-1-935182-68-9.

Fabian Pedregosa. "Scikit-learn: Machine Learning in Python". In: (2011). url: http://arxiv.org/abs/1201.0490 (visited on Apr. 5, 2016).

Fernando Perez and Brian E. Granger. "IPython: A System for Interactive Scientific Computing". In: Computing in Science & Engineering 9.3 (May 2007), pp. 21-29. issn: 1521-9615. doi: 10.1109/MCSE.2007.53. url: http://scitation.aip.org/content/aip/journal/cise/9/3/10.1109/MCSE.2007.53 (visited on Apr. 5, 2016).

Abdul Ghaffar Shoro and Tariq Rahim Soomro. "Big Data Analysis: Apache Spark Perspective". In: Global journal of Computer Science and Technology 15.1 (Feb. 2015). issn: 0975-4172. url: http://www.computerresearch.org/index.php/computer/article/view/1137 (visited on Apr. 5, 2016).

Rajendra Kumar Shukla, Pooja Pandey, and Vinod Kumar, "Big data frameworks: at a glance". In: Int. J.Innovations Adv. Comput. Sci. IJACS 4.1 (2015), pp. 169-175. url: http://academicscience.co.in/admin/resources/project/paper/f201501301422607618. pdf (visited on Apr. 5, 2016).

Mark Summerfeld. Python 3. Ed. by Wydawnictwo Helion. 2010.

Tom White. Hadoop: The Definitive Guide. en. "O'Reilly Media, Inc." May 2012. isbn: 978-1-4493-1152-0.

German Search Report dated Jul. 17, 2017 in German Patent Application No. 102016220777.6.

Khan, Atta R., et al. A Survey of Mobile Cloud Computing Application Models. IEEE Communications Surveys & Tutorials, S. 393-413, 2013. doi: 10.1109/SURV.2013.062613.00160.

Partial English Translation of IN359CH2013, dated Aug. 7, 2015, 10 pages.

Extended European Search Report dated Mar. 9, 2018 in corresponding European Patent Application No. 17195347.4, 10 pages.

U.S. Office Action dated Jan. 28, 2019 in U.S. Appl. No. 15/679,296.

* cited by examiner

| # | ID | Text |
|---|---|---|
| 1 | User: | Hi Aida |
| 2 | AIDA: | Hello Dave, how may I help you? |
| 3 | User: | Tell me, what is your name? |
| 4 | AIDA: | I am Aida v0.2 |
| 5 | User: | Explore http://example.com/file.csv as Dataset1 |
| 6 | AIDA: | The URL seems to point to a CSV file. Summary:<br>Size: 2MB   Rows: 200   Columns: 10<br>Row 1 seems to be a timestamp, run time series analysis? yes/no |
| 7 | User: | Yes |
| 8 | AIDA: | Dataset1 contains information from 2008/1/1 to 2015/12/31, each row has a unique timestamp<br>Search for correlations between remaining columns? yes/no |
| 9 | User: | Yes |
| 10 | AIDA: | Column3 (labeled 'Wind_Speed') and Column10 (labeled 'Env_NO2') seem to be inversely correlated<br>Train regression model? yes/no |
| 11 | User: | No |
| 12 | AIDA: | What should I do? |
| 13 | User: | store Dataset1 |
| 14 | AIDA: | Operation successful.<br>What next? |
| 15 | User: | run full analysis, generate report, and mail it |
| 16 | AIDA: | Assuming Dataset1 as last recently used variable.\label{line:omitted}<br>Task running in background...<br>Awaiting orders. |
| 17 | User: | bye Aida |
| 18 | AIDA: | Ending session, have a nice day! |

FIG. 3

SEMANTIC PARSING WITH KNOWLEDGE-BASED EDITOR FOR EXECUTION OF OPERATIONS

CROSS-REFERENCE TO RELATED APPLICATIONS

This application claims the benefit of German Application No. 102016220777.6, filed Oct. 21, 2016, in the German Intellectual Property Office, the disclosure of which is incorporated herein by reference.

BACKGROUND

1. Field

Embodiments lie in the field of data processing and in particular relate to the execution of software services via a user interface.

2. Description of the Related Art

Data science is an interdisciplinary field about processes and systems to extract knowledge or insights from data in various forms, either structured or unstructured, which is a continuation of some data analysis fields such as statistics, data mining, and predictive analysis.

According to the New York Times, 80% of a typical data science project is sourcing, cleaning and preparing the data, while the remaining 20% is the actual data analysis. Therefore, data analysts/scientists perform repetitive and time consuming tasks.

Software services in data science are time-consuming to configure. Time-savings gained by using software services to automate manual data processing tasks can be lost due to time overheads of configuring the software services to execute.

It is desirable to facilitate user access to data processing software services.

SUMMARY

Additional aspects and/or advantages will be set forth in part in the description which follows and, in part, will be apparent from the description, or may be learned by practice of the embodiments.

Embodiments include a data processing apparatus, the apparatus comprising: a software library, storing a plurality of software services, each executable software service being configured to execute a respective data processing function; a user interface configured to receive a plurality of user input commands, each user input command expressed in a domain specific language and defining a data processing target and a data processing request; and a parser. The parser is configured to extract from each user input command: the data processing request from the domain specific language; and the defined data processing target. The apparatus further comprises: a knowledge base, configured to maintain a record of the data processing request and the defined data processing target for each of the plurality of user input commands; a software service execution scheduler, configured, for each user input command, to obtain the data processing request from the parser, and to compile a schedule of one or more software services from among the plurality of software services to fulfill the data processing request; a software service execution controller configured, for each user input command, to control execution of the compiled schedule of one or more software services, the defined data processing target being the input data to the controlled execution, and to output a processing result of said controlled execution; and a result processor, configured to obtain the output processing result, and, based on the records of data processing requests and defined data processing targets maintained by the knowledge base, to identify a data processing request candidate for performance on the processing result, and to output to the user as a selectable user input command expressed in the domain specific language, via the user interface, the identified data processing request candidate with the processing result defined as a data processing target.

Advantageously, the data processing apparatus defined above enables a user to access the functionality of a plurality of software services by interacting with a single user interface in a domain specific language, obviating the need for the user to have knowledge of the syntax and semantics of the individual software services. Furthermore, the result processor recommends a next action to the user based on previous user actions, thus enabling the user to benefit from the experience of the apparatus. The result processor facilitates analysis of the processing target by proposing an option for additional processing of the processing result, based on previous data processing requests.

Data processing requests specify a desired data processing result, for example, by specifying a semantic descriptor of output data or by specifying a data type of output data. The software service execution scheduler converts the data processing request to a schedule of software services, which are in turn instructed to execute by the software service execution controller.

The domain specific language comprises controlled vocabulary that allows using natural language sentences describing operations in a very high level. It provides a natural way to interact with the data processing capabilities of the apparatus by using a language that is natural to the user.

The parser converts user inputs expressed in domain specific language to queries (data processing requests) for processing by the data processing apparatus.

The software services may be data science software services. That is, the data processing functions performed by the software services when executed are data science processing functions. Data science is the study & analysis of properties of the data itself.

The data processing apparatus may be a web server and the software services web services. The software services, whether web services or otherwise, may be microservices. Each microservice implements (or wraps an external resource implementing) some atomic functionality in the system. Microservices may be annotated with meta-information about the semantics of the operations that they perform.

The parser may be configured to extract a data processing request from the domain specific language of the user input by at least: parsing the domain specific language into a series of domain specific language elements; querying a domain specific language map, said domain specific language map mapping each member of a vocabulary of domain specific language elements to a data processing request element, to obtain a data processing request element mapped to each member of the series of domain specific language elements; and combining the obtained data processing request elements to form the data processing request.

The domain specific language map translates from the domain specific language employed by the user in interacting with the apparatus via the user interface, to a data processing request which can be used as the basis for a schedule of execution of software services by the software service execution scheduler.

Optionally, the software service execution scheduler is configured to maintain a software service registry, the software service registry comprising an entry for each of the plurality of software services, the entry identifying the respective software service and specifying a data processing function performed by the software service when executed; wherein the data processing functions are each specified as one or more data processing request elements to which the domain specific language elements are mapped; and wherein the software service execution scheduler is configured to select software services for inclusion in the schedule by matching data processing request elements from the data processing request to software services for which the respective data processing request element is included in the specified data processing function in the respective registry entry.

The data processing request elements are, for example, semantic descriptors of data processing functions. The software service registry entries may be generated by a system administrator of the apparatus upon addition of software services to the software library. Advantageously, using a common set of semantic descriptors for the data processing request elements to which user entries are mapped, and for the specification of data processing functions of software services, enables the software service execution controller to interpret the data processing request in terms of specific software services to execute.

In a particular implementation of the result processor, the result processor is further configured to output the obtained processing result to the user via the user interface.

The processing result may be output to the user in complete or summarized form. For example, the result processor may comprise processing logic for extracting a summary from a processing result. Software services may be configured to output processing results to a particular URL (uniform resource locator) or URI (uniform resource identifier) specified for the software service, so that the output processing result may be a link or reference to said URL or URI, or may comprise data copied therefrom.

Optionally, the records of data processing requests and defined data processing targets on which the identification of the data processing request candidate is based are constrained to records of data processing requests and defined data processing targets input to the user interface by the same user to which the identified data processing request candidate is to be output.

The data processing apparatus may further comprise a user authentication processor, configured to authenticate a user by username & password or by token.

Advantageously, the constraining to records of a particular user enable idiosyncratic user behavior to be reflected in the proposed next action (the data processing request candidate) output to the user, and also protects a user from the idiosyncratic behavior of others. Furthermore, it may be that users wish their actions to remain undiscoverable to others, and constraining to records of the same user prevents one user's actions being discoverable to another, albeit anonymously, in the form of a proposed next action.

Records are maintained by the knowledge base. In particular, the records of data processing requests and defined data processing targets maintained by the knowledge base may include, for each defined data processing target: one or more data types of data in the data processing target; the result processor being configured to identify a data processing request candidate for performance on the processing result by recognizing a data type of data in the processing result, and identifying, as the candidate, a data processing request in a knowledge base record for a user input command in which the defined data processing target is recorded as including data of the recognized data type.

A data type being a particular kind of data item, as defined by the values it can take, the programming language used, or the operations that can be performed on it.

The result processor exploits knowledge of previous user actions to inform selections of actions (data processing request candidate) to propose to the user. The result processor therefore behaves as a machine learning mechanism, or artificial intelligence mechanism. Data type provides a characteristic by which to distinguish relevant from irrelevant records. For example, if a user typically initiates further analysis of time-series data, then this will be discovered by the result processor upon finding knowledge base records for the user in which the data processing target includes time-series data.

Furthermore, it may be that the identified data processing request candidate is selected by determining a most common data processing request among a relevant subset of the records maintained by the knowledge base, the relevant subset of records being those records for which a quantification of similarity between the characterization of data in the defined data processing target and the characterization of the data in the processing result is above a predefined threshold.

The characterization may comprise values of one or more characteristics. The quantification of similarity may be, for example, a cosine distance of a vector representing the values. Non-numerical values may be mapped to numerical values for cosine distance comparison. As an alternative to cosine distance (or as an additional quantification to be combined with the cosine distance), the quantification of similarity may be the Mahalanobis distance. For example, the apparatus includes a support vector machine configured to accept two vectors representing values of characteristics as an input, and to output a value representing the Mahalanobis distance between the two input vectors.

The user interface may be implemented by an interface including one or more from among the following for interacting with a user: a web interface; an application programming interface; a command line interface; a user voice command interface; and a graphical user interface.

Plural implementations of the user interface are listed above. Optionally, the system may be operable in a number of different modes, each mode being associated with a particular implementation of user interface.

The parser is configured to extract a data processing request from the user input. Such extracting may include, at least: extracting an incomplete data processing request from the user input; outputting to the user, via the user interface, a prompt for information to complete the incomplete data processing request; receiving, via the user interface, a response to the prompt from the user; and completing the incomplete data processing request with the received response.

Optionally, the software service execution scheduler is configured to: maintain a software service registry, the software service registry comprising an entry for each of the plurality of software services, the entry identifying the respective software service and specifying a data processing function performed by the software service when executed; divide the data processing request into a series of one or more instructed data processing functions; and compile an execution schedule, of one or more software services, from among the plurality of software services identified in the registry, to fulfill the respective data processing request by, for each of the one or more instructed data processing functions, identifying a software service for which the processing function specified in the registry matches the requested data processing function, and including the identified software service in the execution schedule.

The software service execution controller is configured to compile the schedule by at least: when more than one software services are identified for which the processing function specified in the registry matches one of the requested data processing functions, requesting a selection of one software service from among the more than one software services as manual selection candidates by a user of the apparatus, and receiving the requested selection from the user. Furthermore, the software service execution scheduler is configured to maintain a record of the compiling of the execution schedule for the respective instructed data processing function, including in the record the identity of the manual selection candidates and an indication of the received user selection; the software service execution scheduler being configured to automate the selection of one software service from among more than one software services identified for performing a requested data processing function based, at least partially, on the recorded indication of the received user selection from among manual selection candidates matching the more than one software services.

The software service execution scheduler makes a selection from among plural candidates based on maintained records of selections made by a user. Such records may be stored with a characterization of the data processing target (i.e. values of one or more characteristics of the data: data size; data type; semantic representation of concept instantiated by the data) for processing by the software services from which the selection was made. The data processing target of the instructed data processing function is characterized in the same way (i.e. with values of the same characteristics), and hence the data characterizations provide a basis to discriminate between relevant and irrelevant records, with, for example, a most common selection among the relevant records being the automated selection. The discrimination between relevant and irrelevant may be achieved by imposing a threshold minimum cosine distance between vectors representing the characterization of the data processing target of the instructed data processing function (for which an automated selection is sought) and the data processing target for which the record is maintained.

Advantageously, such a machine learning aspect to the software service execution scheduler enables intelligent scheduling of software services to satisfy a received data processing request in the absence of manual input. It is noted that manual inputs in satisfying previous data processing requests may be utilized by the machine learning mechanism.

Embodiments of another aspect include: a data processing method, comprising: storing a plurality of software services, each software service being configured to execute a respective data processing function; receiving, via a user interface, a plurality of user input commands, each user input command expressed in a domain specific language and defining a data processing target and a data processing request; extracting from each user input command: the data processing request from the domain specific language; and the defined data processing target. The method further comprises maintaining a record of the data processing request and the defined data processing target for each of the plurality of user input commands; and, for each user input command: obtaining the data processing request from the parser, compiling a schedule of one or more software services from among the plurality of software services to fulfill the data processing request, controlling execution of the compiled schedule of one or more software services, the defined data processing target being the input data to the controlled execution, and outputting a processing result of said controlled execution. The method further comprises obtaining the output processing result, and, based on the records of data processing requests and defined data processing targets maintained by the knowledge base, identifying a data processing request candidate for performance on the processing result, and outputting to the user via a user interface a selectable user input command expressed in the domain specific language, via the user interface, the identified data processing request candidate with the processing result defined as a data processing target.

Embodiments of another aspect include a computer program which, when executed by a computing apparatus, causes the computing apparatus to function as a system defined in the claims as an embodiment.

Embodiments of another aspect include a computer program which, when executed by a computing apparatus, causes the computing apparatus to perform a method defined above or elsewhere in this document as an embodiment.

Furthermore, embodiments include a computer program or suite of computer programs, which, when executed by a plurality of interconnected computing devices, cause the plurality of interconnected computing devices to operate as a system.

In any of the above aspects, the various features may be implemented in hardware, or as software modules running on one or more processors. Features of one aspect may be applied to any of the other aspects.

The embodiments also provide a computer program or a computer program product for carrying out any of the methods described herein, and a computer readable medium having stored thereon a program for carrying out any of the methods described herein.

A computer program embodiment may be stored on a computer-readable medium, or it could, for example, be in the form of a signal such as a downloadable data signal provided from an Internet website, or it could be in any other form.

BRIEF DESCRIPTION OF THE DRAWINGS

A detailed description of embodiments will now be provided, with reference to the accompanying drawings, in which:

FIG. 3 illustrates user inputs and messages output to the user by the data processing apparatus.

DETAILED DESCRIPTION

Figure 1:
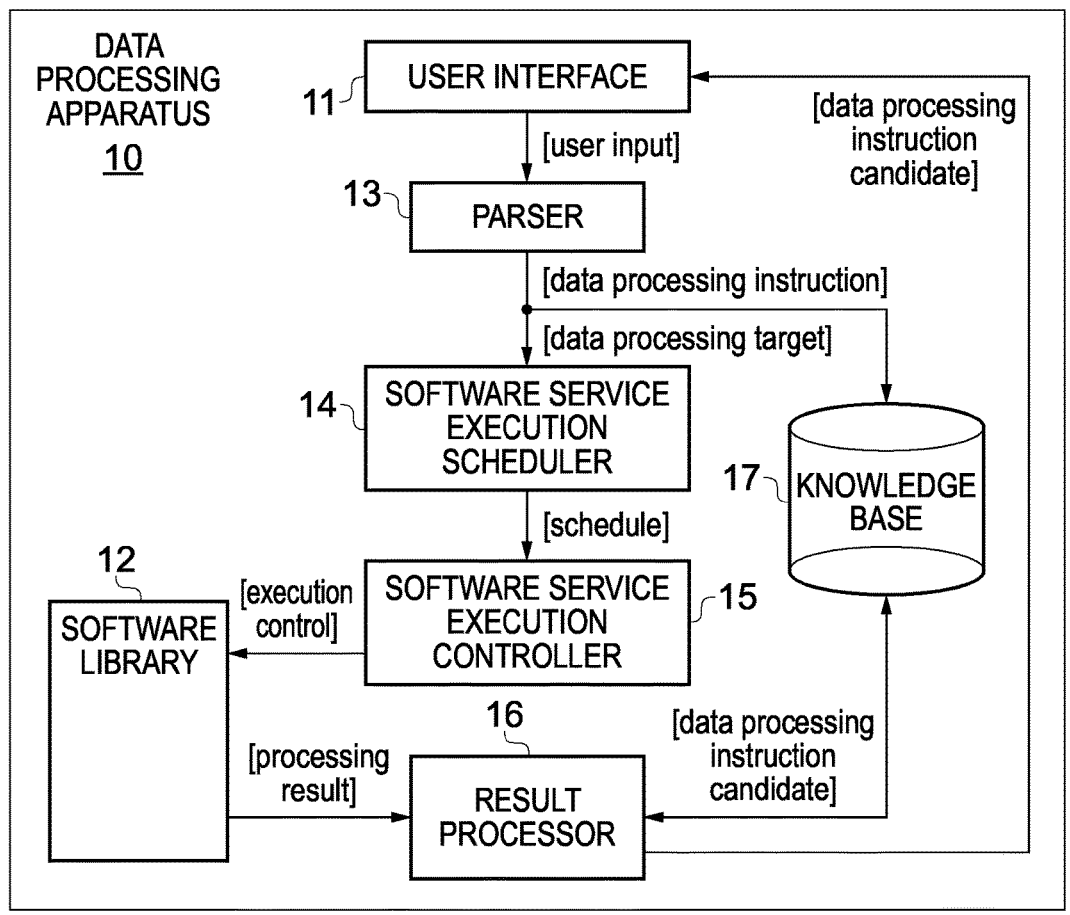
FIG. 1 illustrates a data processing apparatus.

Reference will now be made in detail to the embodiments, examples of which are illustrated in the accompanying drawings, wherein like reference numerals refer to the like elements throughout. The embodiments are described below by referring to the figures.

FIG. 1 illustrates a data processing apparatus 10. The data processing apparatus 10 comprises a user interface 11, a parser 13, a software service execution scheduler 14, a software service execution controller 15, a result processor 16, and a knowledge base 17; which collection of components may be collectively referred to as a virtual assistant, since those components provide intelligent (based on experience) support to a user in accessing the functionality provided by software services in the software library 12.

Figure 2:
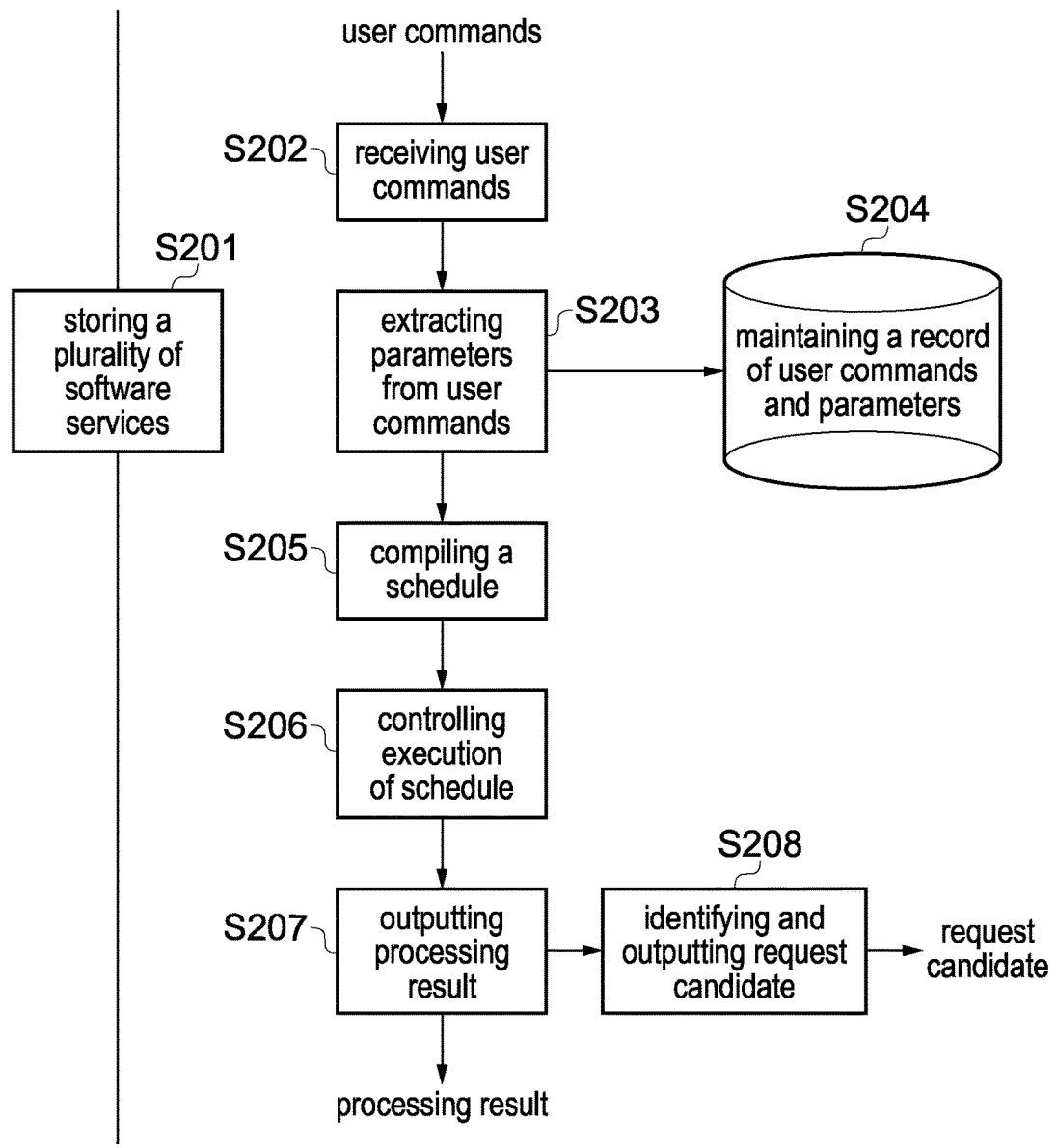
FIG. 2 illustrates a data processing method.

FIG. 2 illustrates a data processing method of an embodiment.

A step of storing a plurality of software services, each software service being configured, upon execution, to execute a respective data processing function, is represented by step S201 in FIG. 2. The line intersecting step S201 indicating the storage persists during performance of steps S202 to S208. The storage of software services in step S201 may be performed by the software library 12 of FIG. 1.

The software library 12 stores a plurality of executable software services. For example, the software services may be web services, and whether web service or otherwise, the software services may be microservices.

A microservice is an atomic service in a data processing apparatus. Atomic in this context means single responsibility or single function. A microservice is distinguished from a generic web service by the dimension of service. For example, a generic web service would include some form of authentication as part of a wider functionality. In a microservice-based apparatus, authentication is a dedicated microservice.

The software services, whether microservices or otherwise, may be RESTful software services, each defining methods for GET, and POST and/or PUT requests.

REST (Representational State Transfer) is an architectural style which governs the proper behavior of participants in the web for machines. REST sets out constraints for system architectures to which conforming is described as being 'RESTful', the first of which is that the architecture has a client-server arrangement, with clients being separated from servers by a uniform interface. There are four guiding principles of the interface between client and server, and an interface developed in accordance with these principles can be described as 'RESTful'. For example, an API can be written in accordance with the REST guiding principles for interfaces to the software services, and would hence be described as a 'RESTful API'. Such a restful API for a software service may be stored in a registry entry for a software service stored by the software service execution scheduler 14, or stored in a location made accessible (for example, by a reference) by a reference in said registry. HTTP as a protocol can be used in a RESTful manner, and RESTful HTTP is suitable for the web for machines. RESTful interfaces (APIs) are popular for a number of key reasons: there is simplicity of the basic protocol built on a proven foundation with solid architectural principles, and the result is approachable and usable by web developers.

In brief, the REST architectural style describes six constraints (one of the six is optional) on a system architecture are as follows:
the architecture should be client-server;
the client and server are separated by a uniform interface;
the architecture is stateless, meaning that no client context is stored on the server between requests from the client—each request contains all of the information necessary to service the request, with state information held in the client itself;
clients are able to cache responses;

(optional) functionality may be extended by a server transferring logic to a client which the client can execute.

In the context of the software service execution system, the client is the entity making the data processing request, and the server is the web server or other computing device executing the software services. The data processing apparatus 10, either as part of the software library 12 or otherwise, may comprise an execution platform for the plurality of software services, for example, a processor and memory to store the data being processed and execute the processing logic of the software service. The plurality of software services stored by the software library 12 may be standalone software services for execution by the data processing apparatus 10, or may wrap externally held and executed software services.

The guiding principles for the uniform interface are briefly summarized below:
individual resources in the domain can be identified in requests from the client (this would be via URIs (Universal Resource Identifiers) in a web-based system). The resources themselves are separate entities from the representations returned to the client;
the representation of a resource held by a client is sufficient to give the client enough information to modify or delete the resource on the server (permissions allowing);
each message between client and server contains enough information for the recipient to process the message;
the representation of a resource provided from the server to the client should include hypertext links to related resources.

A positive aspect of the REST architectural style is that it links well with information models, an information model being a formalized description of items in a domain and relationships between those items. The operations allowed in a RESTful API are constrained (fixed), this avoids the unwanted side effects of poor programming behavior which would ordinarily lead to problems in linking an interface with an information model.

In fact, a RESTful API for a particular domain may be defined purely in terms of the information model for the domain, and by how this model then appears inside different data formats, the data formats being wire level (low level or implementation level) manifestations of the information model. Unfortunately, APIs currently in use show disparities regarding their approach to information modeling, how this appears inside data formats, and how the semantics of HTTP are brought to use in the specific domain of the API(s) in question. This lack of consistency is problematic since potential benefits of a RESTful protocols are lost, for example, the potential for re-usable toolkits (e.g. standard code) and generic client agents (equivalent to a browser).

The virtual assistant components may be realized by instructions stored on a memory and executed by a processor.

A step of receiving, via a user interface, a plurality of user input commands, each user input command expressed in a domain specific language and defining a data processing target and a data processing request; is represented by S202 in FIG. 2. The receiving user commands step S202 may be performed by the user interface 11 of FIG. 1.

The user interface 11 is configured to receive a plurality of user input commands, each user input command at least partially expressed in a domain specific language and defining a data processing target and a data processing request. The data processing target may be defined by a URI or URL at which the data processing target (i.e. some data such as a file) is accessible. The domain specific language may define a data processing target by some syntax or semantic information indicating that a next part of the user input is a data processing target, for example, [VERB] [TARGET], so that the use of a verb in the domain specific language of the user input indicates that a data processing target is to follow.

Domain specific language is a vocabulary of terms which are recognizable among a natural language input, and which map to specific elements of data processing requests in the apparatus 10.

The user interface 11 interacts with the user to enable user input commands to be input to the apparatus 10. The user interface 11 comprises at least one means for interacting with a user. For example, the user interface includes at least one of: a web interface; an application programming interface; a command line interface; a user voice command interface; and a graphical user interface. The user input received by the user interface 11 is at least partially expressed in domain specific language. Complete absence of domain specific language from user input received by the user interface 11 may cause the user interface to output a message requesting a new input. It is noted that the parser 13 may be required to notify the user interface 11 of the absence or otherwise of domain specific language from the user input.

The user interface 11 also provides a means to output processing results, in full or summarized form, to the user. The user interface 11 also provides a means to propose a next data processing action to the user, in the form of a data processing request candidate, expressed in domain specific language (and therefore understandable to the user) and selectable by the user as a user input. For example, such a data processing request candidate may be output in a sentence such as: "would you like me to [semantic representation of data processing function] the [definition of data processing target]?", to which a "yes" from the user would be sufficient to initiate execution of the software service performing the data processing function on the defined data processing target.

A step of extracting from each user input command: the data processing request from the domain specific language; and the defined data processing target; is represented by step S203 in FIG. 2. It is noted that the term parameters is used as shorthand for the extracted data processing request & data processing target. The extracting parameters from user commands step S203 of FIG. 2 may be performed by the parser 13 of FIG. 1.

The parser 13 is configured to extract information from the user input that can be used to control execution of software services. Noting that the software services each perform a single data processing function on input data, the information required to extract is a requested data processing function (or functions) and a location from which the input data for processing is accessible. In particular, the parser 13 is configured to extract from each user input command: the data processing request from the domain specific language; and the defined data processing target.

The parser 13 serves as a translator between the domain specific language in which user inputs are expressed, and the vocabulary of the software service execution scheduler, which selects software services to execute in order to fulfill the data processing request defined by the user. To that end, the parser 13 may store a domain specific language map, said domain specific language map mapping each member of a vocabulary of domain specific language elements to a data processing request element.

The parsed data processing request and data processing target are output by the parser 13 and obtained by both the software service execution scheduler 14 and knowledge base 17.

A step of maintaining a record of the data processing request and the defined data processing target for each of the plurality of user input commands; is represented by step S204 of FIG. 2. Of course, the maintaining is persistent throughout multiple executions of the method. The maintaining a record of user commands and parameters step S204 of FIG. 2 may be performed by the knowledge base 17 of FIG. 1.

The knowledge base 17 therefore receives a record, for storage, of data processing instructed by a user, and the data upon which said data processing is instructed. The data may be characterized in that record by, for example, one or more data types of data items among the data.

A step of obtaining the data processing request from the parser, and compiling a schedule of one or more software services from among the plurality of software services to fulfill the data processing request; is represented by step S205 in FIG. 2. The compiling a schedule step S205 may be performed by the software service execution scheduler 14 of FIG. 1.

The parsed data processing request defines one or more data processing functions. It may be that some processing of the parsed data processing request is performed by the software service execution scheduler 14 in order to determine the constituent data processing function(s). That is to say, the constituent data processing function(s) may be implicitly defined by the parsed data processing request and extracted (i.e. made explicit) by the software service execution scheduler 14, for example, by reference to the software services themselves or to a registry of software services maintained by the service execution scheduler 14. For example, the parsed data processing request may be "summarize" and the data processing target may be plural disparate relational databases. A software service has a registry entry indicating that it performs a summarize data processing function. However, the registry entry specifies that input data is to be stored locally as a single table. Another software service has a registry entry indicating that it performs a load data processing function, with input data being an external database and a data processing result being a locally stored table of data. Another software service has a registry entry indicating that it performs a table join on locally stored tables, taking plural locally stored tables as inputs and generating as a processing result a single locally stored table. This complex example exemplifies a technique for compiling a software service execution schedule.

In summary, the data processing request may be defined in terms of a processing result. The software service execution scheduler 14 stores a registry of software services of the software library 12, defined in terms of the input data on which they are operable, and the output generated (for example, both input and output defined by a data type or semantic descriptor thereof). The software service execution controller 14, upon identifying a type of data of the parsed data processing target, then compiles a schedule by selecting software services in a stepwise fashion to go from the type of data of the parsed data processing target to the type of data of the processing result of the data processing request.

In a more simple example, each parsed data processing request may correspond to a single data processing function performed by a particular software service, and hence compiling the schedule is simply a process of matching the data processing function to the software service.

An order in which the constituent data processing functions are to be performed in order to fulfill the data processing request may also be defined by the parsed data processing request.

A schedule, which may also be referred to as an execution schedule or execution plan, is a plan identifying which software services to execute, in which order (noting that the order may include parallel execution of plural software services), and with which input data. The compiling of the schedule and control of execution are not necessarily steps performed serially. It may be that the compiling is adaptive rather than prescribed or predetermined. The compilation of an element of the execution schedule may be dependent upon the outcome of execution of preceding software services in the execution schedule. The schedule is output by the software service execution scheduler 14 and obtained by the software service execution controller 15. It is noted that processing results from the software services may be input to the software service execution scheduler 14 for use in adaptive compilation.

The schedule is compiled by the software service execution scheduler 14 in order to fulfill the parsed data processing request, for example, by using annotations about the data processing functions of the software services, which annotations may be stored in a registry. For example, it may be that the parsed data processing request specifies a particular data type sought as a processing result, for example, specifying the particular data type semantically or by use of a particular filename or group of filenames. The execution schedule is compiled by the software service execution scheduler 14 by determining a software service or series of software services stored by the software library 12 which, when executed (in the case of a series, with proceeding software services in the series taking as an input the processing result(s) of one or more preceding software service (s) in the series) transform the data processing target output by the parser 13 into the particular data type sought as a processing result and specified by the parsed data processing request.

Each of the software services is configured to execute a respective data processing function. The data processing executed by each of the software services transforms input data of a particular type into output data of a particular type. The exception to this singular input type to output type relationship is the event of a failure of the software service, such as a timeout, which does not generate output data of the output type. Type means a type of data, and may be specified by, for example, a single or group of filename extensions or file types, and/or by a semantic descriptor or descriptor(s) of the data.

A step of controlling execution of the compiled schedule of one or more software services, the defined data processing target being the input data to the controlled execution; is represented by step S206 in FIG. 2. The controlling execution of the schedule step S206 may be performed by the software service execution controller 15 of FIG. 1. A step of outputting a processing result of the controlled execution is represented by S207 in FIG. 2, and may be performed by the software service execution controller 15 of FIG. 1.

The schedule is output by the software service execution scheduler 14 and obtained by the software service execution controller 15. The software service execution controller 15 is configured, for each user input command, to control execution of the compiled schedule of one or more software services, the defined data processing target being the input data to the controlled execution, and to output a processing result of said controlled execution. Controlling execution of the schedule by the software service execution controller 15 is a process of issuing calls to the respective software services to execute, in the order/timing determined by the schedule, and with input data specified by the schedule. The line marked "execution control" between the software service execution controller 15 and the software library 12 in FIG. 1 illustrates the control of execution. For example, controlling execution comprises calling the or each of the software services included in the schedule to perform the respective data processing function on input data specified in the call. The input data to the first of a series of software services in the schedule is the data processing target defined in the user input, with the input data of subsequent software services in the schedule being the processing result of the adjacent preceding software service in the schedule. Input data may be specified by reference to a URI or URL from which it is accessible.

FIG. 2 illustrates that the processing result may be output from the apparatus (i.e. to the user) and also to a further process within the apparatus.

An outcome of the execution may be returned to the software service execution scheduler 14 in response to the execution call, for use in compiling the remainder of the schedule for the respective user input. The outcome may be, for example, an indication of whether a processing result was generated or whether the execution timed out. Optionally, the response may include information such as a measurement of the size of data output by the executed software service as a processing result.

Optionally, the software service execution scheduler 14 is configured to revert to the user, via the user interface 11, to select between plural software services suitable for performing a particular data processing function.

The software service execution scheduler 14 may store a registry of software services with an entry per software service, the entry identifying the software service and defining the data processing function performed by the software service when executed. Said definition may be in terms of a semantic descriptor of the data processing function, which may be in domain specific language, or in language which is mapped to domain specific language. Said definition may be in terms of type of input data and type of output data. A match between a data processing function specified for a software service in the registry and a data processing function forming part of a data processing request (an instructed data processing function) is an indication that the software service for which the processing function is specified is suitable to perform the instructed data processing function. The match is based on the definition of the instructed data processing function, and the data processing function specified for the software service in the registry. The match may be based on semantics, for example, the data processing function is defined semantically in the registry (for example, "tokenize"; "load"; "summarize"; "compare") and the instructed data processing function is defined semantically using the same or similar term(s), so that a semantic comparison between the semantic definition of the requested data processing function and the semantic definition of the data processing function yielding a similarity score above a threshold is taken to be a "match". Alternatively or additionally, the definition of the instructed data processing function may be defined in terms of input data and requested processing result, for example, defining each by a semantic descriptor of the data type ("tabular data" "matrix" "document" "vector") or by a filename extension. The data processing functions specified in the registry may be defined in the same way, so that a match is matching input and output filename extensions, or matching (i.e. semantic similarity above a threshold) input and output semantic data type descriptors. The semantic data type descriptor is a semantic representation of the concept instantiated by the data.

A step of obtaining the output processing result, and, based on the records of data processing requests and defined data processing targets maintained by the knowledge base, identifying a data processing request candidate for performance on the processing result, and outputting to the user via a user interface a selectable user input command expressed in the domain specific language, via the user interface, the identified data processing request candidate with the processing result defined as a data processing target; is represented by step S208 of FIG. 2. The identifying and outputting request candidate step S208 of FIG. 2 may be performed by the results processor 17 of FIG. 1.

Once execution of the schedule is complete, the processing result is output to the result processor 16. For example, in the case of the schedule defining a series of software services in which each software services takes as input data the processing result of the preceding in the series, the processing result may be the processing result of the final software service in the series. Although not specifically illustrated in FIG. 1, the result processor 16 may be notified of the parsed data processing request, and in particular, any particular element of the parsed data processing request indicating a form or destination of output data sought in response to the user input.

The result processor 16 is configured to obtain the output processing result, and, based on the records of data processing requests and defined data processing targets maintained by the knowledge base, to identify a data processing request candidate for performance on the processing result, and to output to the user as a selectable user input command expressed in the domain specific language, via the user interface, the identified data processing request candidate with the processing result defined as a data processing target. In other words, the result processor 16 refers to the records of which data processing requests have been carried out on which target data, to determine a next data processing request to propose to the user.

In a simple example, the record of the data processing target in the knowledge base includes a value of one or more characterizations of the data processing target. Such characterizations may include: amount of data; data type (in terms of syntax); semantic descriptor (semantic representation of concept instantiated by the data). The result processor 16 obtains values of one or more of said characterizations for the processing result. It is noted that a single processing result may contain different types of data and data having different semantic descriptors. In which case, multiple characterizations each apply to respective parts of the processing result (for example, each column), and the procedure of finding a candidate data processing request can be performed multiple times for the single processing result.

The characterization of (all or part of) the processing result can be used in many ways to inform the selection of a data processing request candidate. Two particular techniques will be set out.

In a first technique, the processing result characterization is compared with recorded processing target characterizations (for example, using a vector distance comparison) to obtain a quantification of the similarity between the processing result characterization and each of the processing target characterizations. A threshold is set (which may be predefined or set at a fixed proportion) and only those recorded processing target characterizations for which the quantification of similarity exceeds the threshold are considered. Of those considered, the most common corresponding data processing request (noting that each record includes a data processing request and a data processing target) is determined and selected for proposal to the user as the data processing request candidate.

In a second technique, the processing result characterization is compared with recorded processing target characterizations (for example, using a vector distance comparison) to obtain a quantification of the similarity between the processing result characterization and each of the processing target characterizations. A contribution to a frequency count to find the most common corresponding data processing request is weighted according to the quantification of similarity. So that, for example, a data processing request commonly performed on data characterized very differently to the processing result builds up a relatively small frequency count, whereas a data processing request carried out less commonly, but on data characterized very similarly to the processing result, builds up a relatively larger frequency count (noting that the processing result is the data upon which the next data processing request is to be performed).

The data processing request candidate selected by the result processor 16 using the records maintained by the knowledge base 17, is output to the user via the user interface, expressed in domain specific language, and identifying (all or part of) the processing result as the processing target. The user is presented with a proposal for a next data processing request, arrived at based on experience of previous user actions, which is selectable by the user for parsing, scheduling, and execution in the same way as other user inputs.

FIG. 3 illustrates exemplary communications between the user and the data processing apparatus. The data processing apparatus is represented by the initials AIDA: Artificial Intelligence for Data Analytics. The data processing functions of the software services in the example of FIG. 3 are data analytics processing functions.

The user interface in the example of FIG. 3 is an interactive shell. Other forms of communication could also be employed, for example, e-mails, a chat window, an interactive webpage, voice commands (as usual for many assistants), gestures, etc.

The example of FIG. 3 exemplifies various elements of the functionality of the data processing apparatus 10.

In line 1 the user initiates a session. The term "Hi" is an example of domain specific language and is interpreted by the parser 13 as initiating a user session.

In line 2, the result of user authentication is output by the user interface 11, with the user ID "Dave" retrieved via an authentication process. In the present example, authentication processing is performed by the data processing apparatus 10 in a manner that is transparent to the user, and is token-based. The user-authentication is triggered by the user input of line 1, initiating a user session. If the user cannot be authenticated, then it is possible that the user is a new user. For a new user, a combination of user and password is requested.

The data processing apparatus 10 stores user preferences on a per user basis, which are loaded and implemented upon authentication. Following authentication, machine learning algorithms, which use records maintained by the knowledge base to select data processing request candidates for presentation to the user, may be trained or otherwise prepared for execution using records relating to past data processing requests from the authenticated user. For example, such records may be loaded into a cache accessible by the machine learning algorithm.

The software services perform data processing functions for data science and data analysis. Information output by the data processing apparatus 10 in response to questions posed by the user, such as in line 3, is tailored to provide information useful to a data science professional. For example in line 4 the user interface outputs to the user accurate information that could be used for support purposes.

The user inputs are parsed by the parser 13. In the example of line 3, the term "tell me" is not recognized as domain specific language and is ignored by the parser 13. The term "what is your name", on the other hand, is domain specific language which maps to an instruction to output system information about the data processing apparatus 10 and specifically the virtual assistant components thereof.

When information is omitted by the user, so that a user input defines only a partial data processing request, or does not unambiguously specify a data processing target, the parser 13 performs processing to:

Infer the missing information when possible.

Display via the user interface a set of possibilities in ambiguous contexts.

Output prompts to the user for the missing information via the user interface when previous options are not feasible.

Output via the user interface a request to the user to reformulate the sentence when all of the above fails.

In the example of line 15, the parser 13 identifies "it" as the data processing target, by processing the input sentence, using natural language processing and the domain specific language mapping. Via inference, using an inference rule which specifies if data processing target not specified, infer that the most recently input data processing target specified by the user is the specified data processing target. The parser 13 may revert to the user for confirmation of inferred information via the user interface 11.

Line 5 illustrates the functionality of the virtual assistant components to function as a very high level programming language. Via the user interface 11 and the parser 13, user inputs are received which define variables and assign a value to them. In the example of line 5, the data processing target is specified as http://example.com/file.csv, and the "as" is recognized as domain specific language which the parser 13 is aware is followed by a name to be assigned to the data stored at the specified URL. The parser 13, when parsing future user inputs in the same session, interprets "dataset1" as defining the data held at the specified URL.

The term "explore" utilized by the user causes a number of software services to be scheduled by the software service execution scheduler 14. The term "explore" is domain specific language, which is interpreted by the parser 13 as a data processing request to summarize the data processing target. Summarize is a data processing function of one or more of the software services, which is known by the software service execution scheduler 14 to correspond to a data processing request to generate a summary. The software service execution scheduler 14 is configured to compile an execution schedule to output a summary of the data processing target. Based on information held by the software service execution scheduler 14, there is no software service which can generate a processing result of a summary with an input of a remotely held csv file. However, there is a software service for which the registry entry indicates a processing result of a summary from an input of a locally held csv file, and another software service for which the registry entry indicates a processing result of a locally held csv file from an input of a remotely held csv file.

The compiled schedule is output to the software service execution controller 15, and the software services executed on the data processing target. The processing result is output to the user via the result processor 16 in line 6. The summary displayed in line 6 is representative, noting that software services may generate much more detailed summaries of data processing targets.

In a more complex example, an instruction to explore a URL that points to a webpage with unknown content may be handled differently by the software service execution scheduler 14, operating adaptively. First scheduling execution of a software service to establish the protocol or protocols for accessing the content of the webpage, and then, following execution of said software service, receiving a processing result from the software service (defining one or more protocols), and then compiling a new schedule of software services based on the defined protocol or protocols. In this manner, the data processing apparatus 10 uses software services stored in the software library 12 to handle several different protocols in a way that is transparent to the user (http, https, ftp, sftp, etc.). The data processing apparatus 10 provides the user with an intuitive interface based on natural language structure and domain specific language elements.

Line 6 demonstrates that the result processor 16 characterizes the processing result (on a per row or per column basis), and uses the characterization as a key to find relevant previously recorded (in the knowledge base 17) data processing requests from the same user, finding records of data processing targets sharing a characterization with the characterization of the present processing result, and the data processing request of the user in the recorded instances. A machine learning algorithm searches for and finds relevant records using data characterization as a key, and determines, from among the data processing requests in the relevant records, which to output to the user as a data processing request candidate (exemplified in lines 6, 8, 10). The basis on which the machine learning mechanism determines one data processing request from plural, if plural are defined in relevant records, is implementation dependent. In a first exemplary technique, the machine learning algorithm may simply find the most recent record (assuming the records are time-stamped), or the most popular among the most recent n (for example, n=10) records. In a second exemplary technique, the machine learning algorithm may quantify the relevance of each record based on similarity of characterization of the recorded data processing target to the processing result in question (wherein a threshold minimum of the quantification is imposed for a record to be deemed relevant), and a score calculated for each recorded data processing request, wherein the score is a count of relevant records in which the data processing request is defined. Optionally, the contribution to the count made by a record may be weighted according to the respective quantification of relevance.

By characterizing the data of all or part of the processing result, the results processor 16 can be seen as understanding the contents of the file, and using a machine learning algorithm intelligently uses the previous decisions of the user to suggest a next data processing operation based on what makes sense in the current context (i.e. context provided by data characterization and the previous decisions and preferences of the user). In this particular example the system detects the type of one column in the dataset and runs a time series analysis.

Line 10 demonstrates that the result processor 16 may also output a representation of the rationale for outputting a particular data processing request candidate. In addition, line 10 exemplifies that the data processing functions performed on datasets have a very high level, as for instance training a regression model.

Line 13 illustrates accessibility of the persistence layer to the data processing apparatus 10. A software service from the software library 12 is configured to perform an operation of writing a data processing target to the persistence layer upon a "store" user input. The persistence layer may be accessed upon the express instruction of the user as in the example of line 13, or may be automatically used by other software services in the absence of an express instruction from the user, depending on the operation performed, the characteristics of the data and the previous preferences of the user. If the information that the system has is not enough to make a decision in a given context, it will prompt a question to the user via the user interface 11.

Line 15 demonstrates syntax for separating sequences of operations using commas, consistent with natural language syntax. Without prior configuration, the system provides freedom to use other separators and combinations of them, as for example: ',', '.', 'and', or 'then'.

As another example of the intelligence of the data processing apparatus 10, in line 16 it can be seen that when the execution of a software service under the control of the software service execution controller 16 software takes, or is expected to take, over a predefined threshold amount of time, the task is automatically sent to the background, the user is notified via the user interface 11 (see line 16), and new user inputs can be submitted during execution.

There may be cases in which no relevant records can be found by the result processor 16, that is to say, based on characterization of all or a part of the processing result, there are no records in the knowledge base 17 of data processing requests having similarly characterized data as a data processing target. In line 8 we see that the user is asked for confirmation on an operation. For example, in the absence of relevant records, such a proposal may instead be based on registry entries for software services defining input data characterized in the same or similar way as the processing result in question. After several iterations, the results processor may use the machine learning capabilities to proactively perform the operations that are usually done with similarly characterized data, or skip the questions for the operations that are never used.

Figure 4:
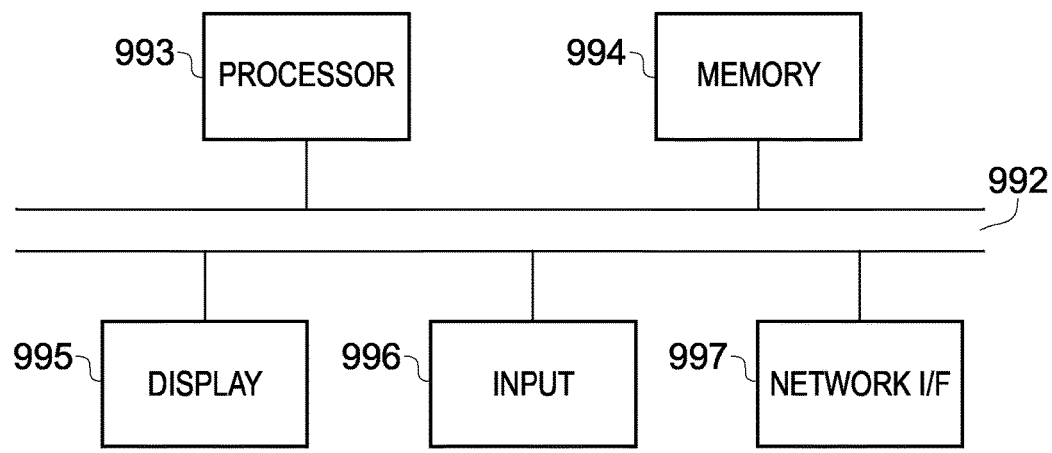
FIG. 4 illustrates a hardware configuration of a data processing apparatus.

FIG. 4 is a block diagram of a computing device, such as a web server, and which may be used to implement a data processing method of an embodiment. The computing device comprises a processor 993, and memory, 994. Optionally, the computing device also includes a network interface 997 for communication with other computing devices, for example with other computing devices of embodiments.

For example, an embodiment may be composed of a network of such computing devices. Optionally, the computing device also includes one or more input mechanisms such as keyboard and mouse 996, and a display unit such as one or more monitors 995. The components are connectable to one another via a bus 992.

The memory 994 may include a computer readable medium, which term may refer to a single medium or multiple media (e.g., a centralized or distributed database and/or associated caches and servers) configured to carry computer-executable instructions or have data structures stored thereon. Computer-executable instructions may include, for example, instructions and data accessible by and causing a general purpose computer, special purpose computer, or special purpose processing device (e.g., one or more processors) to perform one or more functions or operations. Thus, the term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media. By way of example, and not limitation, such computer-readable media may include non-transitory computer-readable storage media, including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices).

The processor 993 is configured to control the computing device and execute processing operations, for example executing code stored in the memory to implement the various different functions of the software library, user interface, parser 13, knowledge bade, software service execution scheduler, software services execution controller, and result processor, described here and in the claims. The memory 994 stores data being read and written by the processor 993. As referred to herein, a processor may include one or more general-purpose processing devices such as a microprocessor, central processing unit, or the like. The processor may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor may also include one or more special-purpose processing devices such as an application specific integrated circuit (ASIC), a field programmable gate array (FPGA), a digital signal processor (DSP), network processor, or the like. In one or more embodiments, a processor is configured to execute instructions for performing the operations and steps discussed herein.

The display unit 997 may display a representation of data stored by the computing device and may also display a cursor and dialog boxes and screens enabling interaction between a user and the programs and data stored on the computing device. The input mechanisms 996 may enable a user to input data and instructions to the computing device.

The network interface (network I/F) 997 may be connected to a network, such as the Internet, and is connectable to other such computing devices via the network. The network I/F 997 may control data input/output from/to other apparatus via the network. Other peripheral devices such as microphone, speakers, printer, power supply unit, fan, case, scanner, trackerball etc may be included in the computing device.

The software library 12 of FIG. 1, and the storing a plurality of software services step S201 of FIG. 2, may be a processor 993 (or plurality thereof) executing processing instructions (a program) stored on a memory 994 and exchanging data via a network I/F 997. In particular, the processor 993 executes processing instructions to receive, via the network I/F or otherwise, execution controls from the software service execution controller 15 and execute the software services as indicated by the received execution controls, as indicated by the "execution controls" arrow in FIG. 1. Furthermore, the processor 993 may execute processing instructions to store software services in the software library 12 on a connected storage unit. Furthermore, the processor 993 may execute processing instructions to transmit, via the network I/F 997, processing results to the result processor 16 for processing.

The user interface 11 of FIG. 1, and the receiving user commands step S202 of FIG. 2, may be a processor 993 (or plurality thereof) executing processing instructions (a program) stored on a memory 994 and exchanging data with a user via a network I/F 997 or other input means. In particular, the processor 993 executes processing instructions to receive, via the network I/F or other input means, user input from the user and transmit the user input to the parser 13, as indicated by the "user input" arrow in FIG. 1. In addition, the user interface executes processing instructions to output the data processing request candidate to the user as a selectable user input command.

The parser 13 of FIG. 1, and the extracting parameters from user commands step S203 of FIG. 2, may be a processor 993 (or plurality thereof) executing processing instructions (a program) stored on a memory 994 and exchanging data with the user interface 11 and software service execution scheduler 14 via a network I/F 997 or another means of data exchange. In particular, the processor 993 executes processing instructions to receive from the user interface 11, the user input command, to extract the data processing request and the defined data processing target from the user input command, and output the extracted information to the knowledge base 17 and software service execution scheduler, as indicated by the arrows marked "data processing request" and "data processing target" in FIG. 1. Furthermore, the processor 993 may execute processing instructions to store the extracted information on the knowledge base as a record.

The knowledge base 17 of FIG. 1, and the maintaining a record of user commands and parameters step S204 of FIG. 2, may be a processor 993 (or plurality thereof) executing processing instructions (a program) stored on a memory 994 and exchanging data via a network I/F 997 or another means of data exchange. In particular, the processor 993 executes processing instructions to receive, via the network I/F, information extracted from user inputs by the parser 13 from the parser 13, and to store the extracted information as a record. Furthermore, the records maintained by the knowledge base 17 are accessible by the result processor 16 in identifying a data processing request candidate. Furthermore, the processor 993 may execute processing instructions to store maintained records on a connected storage unit and/or to transmit, via the network I/F 997, maintained records relevant to a particular user (and processing result) to the result processor 16 for processing.

The software service execution scheduler 14 of FIG. 1, and the compiling a schedule step S205 of FIG. 2, may be a processor 993 (or plurality thereof) executing processing instructions (a program) stored on a memory 994 and exchanging data via a network I/F 997 or another means of data exchange. In particular, the processor 993 executes processing instructions to receive, via the network I/F or otherwise, a data processing request and data processing target extracted from a user input by the parser 13, and compile a schedule of software services to fulfill the data processing request with the data processing target as input data, and to output the schedule, as indicated by the "schedule" arrow in FIG. 1. Furthermore, the processor 993 may execute processing instructions to store the schedule on a connected storage unit and/or to transmit, via the network I/F 997, the schedule to the software service execution controller 15 for execution.

The software service execution controller 15 of FIG. 1, the controlling execution step S206 of FIG. 2, and the outputting step S207 of FIG. 2, may be a processor 993 (or plurality thereof) executing processing instructions (a program) stored on a memory 994 and exchanging data via a network I/F 997 or another form of data exchange. In particular, the processor 993 executes processing instructions to receive, via the network I/F or another form of data exchange, the schedule output by the software service execution schedule, and to control execution of the schedule by the software services of the software library, as indicated by the "execution control" arrow of FIG. 1.

The result processor 16 of FIG. 1, and the identifying and outputting a request candidate S207 of FIG. 2, may be a processor 993 (or plurality thereof) executing processing instructions (a program) stored on a memory 994 and exchanging data via a network I/F 997 or another form of data exchange. In particular, the processor 993 executes processing instructions to receive, via the network I/F or otherwise, processing results from the software services of the software library 12 executed under the control of the software service execution controller 15 and identify a data processing request candidate from among records held by the knowledge base (using a machine learning algorithm). Furthermore, the processor 993 may execute processing instructions to store the identified data processing request candidate on a connected storage unit and/or to transmit, via the network I/F 997 or otherwise, the identified data processing request candidate to the user via the user interface 11.

Method embodiments may be carried out on a computing device such as that illustrated in FIG. 4. Such a computing device need not have every component illustrated in FIG. 4, and may be composed of a subset of those components. A method embodiment may be carried out by a single computing device in communication with one or more data storage servers via a network. The computing device may be a data storage itself storing the knowledge base 17 and processing results.

A method embodiment may be carried out by a plurality of computing devices operating in cooperation with one another. One or more of the plurality of computing devices may be a data storage server storing at least a portion of the knowledge base 17 and processing results.

Although a few embodiments have been shown and described, it would be appreciated by those skilled in the art that changes may be made in these embodiments without departing from the principles and spirit thereof, the scope of which is defined in the claims and their equivalents.

What is claimed is:

1. A data processing apparatus, comprising memory hardware, and processor hardware coupled to the memory hardware,
    the memory hardware storing a software library, storing a plurality of software services, each software service being executable by the processor hardware to perform a respective data processing function;
    the memory hardware storing processing instructions which, when executed by the processor hardware, cause the processor hardware to implement:
    a user interface configured to receive a plurality of user input commands, each user input command expressed in a domain specific language and defining a data processing target and a data processing request;

a parser configured to extract from each user input command:
the data processing request from the domain specific language; and
the data processing target;
a knowledge base, configured to maintain on the memory hardware a record of the data processing request and the data processing target for each of the plurality of user input commands;
a software service execution scheduler, configured, for each user input command, to obtain the data processing request from the parser, and to compile a schedule of one or more software services from among the plurality of software services to fulfill the data processing request;
a software service execution controller configured, for each user input command, to control execution of a compiled schedule of one or more software services, the data processing target being input data to execution, and to output a processing result of said execution; and
a result processor, configured to obtain the processing result, and, based on records of data processing requests and defined data processing targets maintained by the knowledge base, to identify a data processing request candidate for performance on the processing result, and to output to the user as a selectable user input command expressed in the domain specific language, via the user interface, the data processing request candidate with the processing result defined as a data processing target.

2. A data processing apparatus according to claim 1, wherein:
the parser is configured to extract the data processing request from the domain specific language of user input by at least:
parsing the domain specific language into a series of domain specific language elements;
querying a domain specific language map, said domain specific language map mapping each member of a vocabulary of the domain specific language elements to a data processing request element, to obtain the data processing request element mapped to each member of the series of domain specific language elements;
combining obtained data processing request elements to form the data processing request.

3. A data processing apparatus according to claim 2, wherein
the software service execution scheduler is configured to maintain a software service registry, the software service registry comprising an entry for each of the plurality of software services, the entry identifying the respective software service and specifying a data processing function performed by a software service when executed; wherein
the data processing functions are each specified as one or more data processing request elements to which the domain specific language elements are mapped; and
the software service execution scheduler is configured to select software services for inclusion in the schedule by matching data processing request elements from the data processing request to software services for which the respective data processing request element is included in the data processing function in a respective registry entry.

4. A data processing apparatus according to claim 1, the result processor being further configured to output the obtained processing result to the user via the user interface.

5. A data processing apparatus according to claim 1, wherein
the records of data processing requests and defined data processing targets on which the identification of the data processing request candidate is based are constrained to the records of data processing requests and the data processing targets input to the user interface by a same user to which the identified data processing request candidate is to be output.

6. A data processing apparatus according to claim 1, wherein
the records of data processing requests and the data processing targets maintained by the knowledge base include, for each data processing target:
a characterization of data in the data processing target;
the result processor being configured to identify a data processing request candidate for performance on the processing result by characterizing some or all data in the processing result, and identifying, as the candidate, a data processing request in a knowledge base record for the user input command in which the characterization of data in the data processing target is at least one of a same or similar to the characterization of the data in the processing result.

7. A data processing apparatus according to claim 6, wherein
the identified data processing request candidate is selected by determining a most common data processing request among a relevant subset of the records maintained by the knowledge base, the relevant subset of records being those records for which a quantification of similarity between the characterization of data in the data processing target and the characterization of the data in the processing result is above a predefined threshold.

8. A data processing apparatus according to claim 1, wherein the user interface comprises at least one or more from among:
a web interface;
an application programming interface;
a command line interface;
a user voice command interface; and
a graphical user interface.

9. A data processing apparatus according to claim 1, wherein the parser is configured to extract the data processing request from the user input by at least:
extracting an incomplete data processing request from the user input;
outputting to the user, via the user interface, a prompt for information to complete the incomplete data processing request;
receiving, via the user interface, a response to the prompt from the user; and
completing the incomplete data processing request with a received response.

10. A data processing apparatus according to claim 1, wherein the software service execution scheduler is configured to:
maintain a software service registry on the memory hardware, the software service registry comprising an entry for each of the plurality of software services, the entry identifying the respective software service and specifying a data processing function performed by the software service when executed;
divide the data processing request into a series of one or more instructed data processing functions; and
compile an execution schedule, of one or more software services, from among the plurality of software services identified in the registry, to fulfill a respective data processing request by, for each of the one or more instructed data processing functions, identifying the software service for which a processing function specified in the registry matches the data processing function, and including an identified software service in the execution schedule.

11. A data processing apparatus according to claim 10, wherein compiling includes when more than one software services are identified for which the processing function specified in the registry matches one of the data processing functions, requesting a selection of one software service from among the more than one software services as manual selection candidates by a user of the apparatus, and receiving the selection from the user; and the software service execution scheduler is configured to maintain a record on the memory hardware of the compiling of the execution schedule for a respective instructed data processing function, including in the record an identity of the manual selection candidates and an indication of a received user selection;

the software service execution scheduler being configured to automate the selection of one software service from among more than one software services identified for performing a requested data processing function based on a recorded indication of the received user selection from among manual selection candidates matching the more than one software services.

12. A data processing method, comprising:

storing, on memory hardware, a plurality of software services, each software service being configured to execute a respective data processing function;

executing, on processor hardware, processing instructions stored on the memory hardware and causing the processor hardware to perform a process including:

receiving, via a user interface, a plurality of user input commands, each user input command expressed in a domain specific language and defining a data processing target and a data processing request;

extracting from each user input command:
the data processing request from the domain specific language; and
the defined data processing target;

maintaining a record of the data processing request and the data processing target for each of the plurality of user input commands;

for each user input command:

obtaining the data processing request from a parser, compiling a schedule of one or more software services from among the plurality of software services to fulfill the data processing request, controlling execution of a compiled schedule of one or more software services, the data processing target being input data to the controlled execution, and outputting a processing result of said execution; and obtaining the processing result, and, based on records of data processing requests and defined data processing targets maintained by the knowledge base, identifying a data processing request candidate for performance on the processing result, and outputting to the user via a user interface a selectable user input command expressed in the domain specific language, via the user interface, the identified data processing request candidate with the processing result defined as a data processing target.

13. A non-transitory computer-readable medium storing a computer program which, when executed by a computing apparatus comprising memory hardware storing a plurality of software services, each software service being configured to execute a respective data processing function, causes the computing apparatus to perform a method comprising:

receiving, via a user interface, a plurality of user input commands, each user input command expressed in a domain specific language and defining a data processing target and a data processing request;

extracting from each user input command:
the data processing request from the domain specific language; and
the data processing target;

maintaining a record of the data processing request and the data processing target for each of the plurality of user input commands;

for each user input command:

obtaining the data processing request from a parser, compiling a schedule of one or more software services from among the plurality of software services to fulfill the data processing request, controlling execution of a compiled schedule of one or more software services, the data processing target being input data to the execution, and outputting a processing result of said controlled execution; and obtaining the processing result, and, based on records of data processing requests and data processing targets maintained by the knowledge base, identifying a data processing request candidate for performance on the processing result, and outputting to the user via a user interface a selectable user input command expressed in the domain specific language, via the user interface, the identified data processing request candidate with the processing result defined as a data processing target.

* * * * *